(12) United States Patent
Carbune et al.

(10) Patent No.: US 12,254,885 B2
(45) Date of Patent: **\*Mar. 18, 2025**

(54) DETECTING AND HANDLING FAILURES IN OTHER ASSISTANTS

(71) Applicant: GOOGLE LLC, Mountain View, CA (US)

(72) Inventors: Victor Carbune, Zurich (CH); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,157

(22) Filed: Jan. 13, 2023

(65) Prior Publication Data
US 2023/0169980 A1    Jun. 1, 2023

Related U.S. Application Data

(63) Continuation of application No. 17/087,358, filed on Nov. 2, 2020, now Pat. No. 11,557,300.
(Continued)

(51) Int. Cl.
*G10L 15/32* (2013.01)
*G10L 15/22* (2006.01)

(52) U.S. Cl.
CPC ............ *G10L 15/32* (2013.01); *G10L 15/22* (2013.01); *G10L 2015/223* (2013.01)

(58) Field of Classification Search
CPC ... G06F 3/167; G10L 15/22; G10L 2015/088; G10L 2015/223; G10L 15/08; G10L 15/30; G10L 15/26; G10L 15/18
See application file for complete search history.

(56) References Cited

U.S. PATENT DOCUMENTS

| 10,354,653 B1 | 7/2019 | Vijayvergia et al. |
| 10,971,158 B1 | 4/2021 | Patangay et al. |

(Continued)

FOREIGN PATENT DOCUMENTS

| CN | 110462730 | 11/2019 |
| CN | 110741338 | 1/2020 |

(Continued)

OTHER PUBLICATIONS

European Patent Office; International Search Report and Written Opinion of App. No. PCT/US2020/064987; 12 pages; dated Jul. 5, 2021.

(Continued)

*Primary Examiner* — Mark Villena
(74) *Attorney, Agent, or Firm* — Gray Ice Higdon

(57) ABSTRACT

Techniques are described herein for detecting and handling failures in other automated assistants. A method includes: executing a first automated assistant in an inactive state at least in part on a computing device operated by a user; while in the inactive state, determining, by the first automated assistant, that a second automated assistant failed to fulfill a request of the user; in response to determining that the second automated assistant failed to fulfill the request of the user, the first automated assistant processing cached audio data that captures a spoken utterance of the user comprising the request that the second automated assistant failed to fulfill, or features of the cached audio data, to determine a response that fulfills the request of the user; and providing, by the first automated assistant to the user, the response that fulfills the request of the user.

17 Claims, 7 Drawing Sheets

Related U.S. Application Data

(60) Provisional application No. 63/093,163, filed on Oct. 16, 2020.

(56) References Cited

U.S. PATENT DOCUMENTS

| | | | |
|---|---|---|---|
| 11,646,013 B2* | 5/2023 | Tran | G10L 15/1822 704/232 |
| 2014/0244712 A1 | 8/2014 | Walters et al. | |
| 2016/0104483 A1 | 4/2016 | Foerster et al. | |
| 2016/0155443 A1 | 6/2016 | Khan et al. | |
| 2017/0277993 A1* | 9/2017 | Beaver | G06Q 30/0201 |
| 2018/0063624 A1 | 3/2018 | Boesen | |
| 2018/0082683 A1 | 3/2018 | Chen et al. | |
| 2018/0204569 A1 | 7/2018 | Nadkar et al. | |
| 2018/0293484 A1* | 10/2018 | Wang | G06F 16/632 |
| 2019/0013019 A1 | 1/2019 | Lawrence | |
| 2019/0066672 A1 | 2/2019 | Wood et al. | |
| 2019/0074013 A1* | 3/2019 | Lawrence | G06F 3/167 |
| 2019/0180770 A1 | 6/2019 | Kothari et al. | |
| 2019/0341039 A1 | 11/2019 | Bharadwaj | |
| 2019/0385604 A1 | 12/2019 | Foerster et al. | |
| 2020/0105273 A1* | 4/2020 | O'Donovan | G10L 15/30 |
| 2020/0135200 A1 | 4/2020 | Taparia et al. | |
| 2020/0380968 A1 | 12/2020 | Hatfield et al. | |
| 2020/0402502 A1* | 12/2020 | Hanes | G06F 3/167 |
| 2022/0093104 A1 | 3/2022 | Sharifi et al. | |
| 2022/0115012 A1* | 4/2022 | Huang | G06F 40/205 |
| 2022/0122610 A1 | 4/2022 | Carbune et al. | |

FOREIGN PATENT DOCUMENTS

| | | |
|---|---|---|
| CN | 110785763 | 2/2020 |
| CN | 110998717 | 4/2020 |
| EP | 3224833 | 10/2017 |
| JP | 2020144712 | 9/2020 |
| JP | 2020154082 | 9/2020 |
| WO | 2020116026 | 6/2020 |

OTHER PUBLICATIONS

Australian Patent Office; Examination Report issued in Application No. 2020472583; 4 pages; dated May 10, 2023.
Intellectual Property India; Examination Report issued in Application No. 202227064253; 7 pages; dated Dec. 18, 2023.
Japanese Patent Office; Notice of Reasons for Rejection issued in Application No. 2022-571845; 6 pages; dated Jan. 15, 2024.
Australian Patent Office; Notice of Acceptance issued for Application No. 2020472583, 3 pages, dated Sep. 28, 2023.
China National Intellectual Property Administration; Notification of First Office Action issued in Application No. 202080101563.3; 36 pages; dated May 23, 2024.
China National Intellectual Property Administration; Notice of Grant issued in Application No. 202080101563.3; 6 pages; dated Sep. 30, 2024.
European Patent Office, Intention to Grant issued in Application No. 20829155.9; 50 pages; dated Nov. 15, 2024.
Australian Patent Office; Examination Report issued in Application No. 2024200224; 4 pages; dated Dec. 3, 2024.

* cited by examiner

DETECTING AND HANDLING FAILURES IN OTHER ASSISTANTS

BACKGROUND

Humans can engage in human-to-computer dialogs with interactive software applications referred to herein as "automated assistants" (also referred to as "digital agents", "interactive personal assistants", "intelligent personal assistants", "assistant applications", "conversational agents", etc.). For example, humans (which when they interact with automated assistants may be referred to as "users") may provide commands and/or requests to an automated assistant using spoken natural language input (i.e., utterances), which may in some cases be converted into text and then processed, by providing textual (e.g., typed) natural language input, and/or through touch and/or utterance free physical movement(s) (e.g., hand gesture(s), eye gaze, facial movement, etc.). An automated assistant responds to a request by providing responsive user interface output (e.g., audible and/or visual user interface output), controlling one or more smart devices, and/or controlling one or more function(s) of a device implementing the automated assistant (e.g., controlling other application(s) of the device).

As mentioned above, many automated assistants are configured to be interacted with via spoken utterances. To preserve user privacy and/or to conserve resources, automated assistants refrain from performing one or more automated assistant functions based on all spoken utterances that are present in audio data detected via microphone(s) of a client device that implements (at least in part) the automated assistant. Rather, certain processing based on spoken utterances occurs only in response to determining certain condition(s) are present.

For example, many client devices, that include and/or interface with an automated assistant, include a hotword detection model. When microphone(s) of such a client device are not deactivated, the client device can continuously process audio data detected via the microphone(s), using the hotword detection model, to generate predicted output that indicates whether one or more hotwords (inclusive of multi-word phrases) are present, such as "Hey Assistant", "OK Assistant", and/or "Assistant". When the predicted output indicates that a hotword is present, any audio data that follows within a threshold amount of time (and optionally that is determined to include voice activity) can be processed by one or more on-device and/or remote automated assistant components such as speech recognition component(s), voice activity detection component(s), etc. Further, recognized text (from the speech recognition component(s)) can be processed using natural language understanding engine(s) and/or action(s) can be performed based on the natural language understanding engine output. The action(s) can include, for example, generating and providing a response and/or controlling one or more application(s) and/or smart device(s)). However, when predicted output indicates that a hotword is not present, corresponding audio data will be discarded without any further processing, thereby conserving resources and user privacy.

As automated assistants become more widespread, it is increasingly common to have multiple, different automated assistants running on the same client device, or across different client devices that are located near each other (e.g., in the same room). In some situations, multiple automated assistants may come preinstalled on some client devices, or alternatively users may be provided with the option to install one or more new, additional automated assistants which can specialize in a particular area or at performing certain tasks.

In a situation where multiple automated assistants are running on the same client device and/or across different client devices that are near each other, there may be cases where a user directs a request to a first automated assistant (e.g., by using a hotword associated with the first automated assistant), but the first automated assistant fails to handle the request or returns a suboptimal, inaccurate, or incomplete result in response to the request. However, had the user directed the request to the second automated assistant (e.g., by using a hotword associated with the second automated assistant), the second automated assistant could have handled the request correctly.

SUMMARY

Some implementations disclosed herein are directed to improving device performance and capabilities and improving a user experience provided by an automated assistant running on a device by detecting and handling failures in other automated assistants. As described in more detail herein, in response to detecting a failure of another automated assistant to fulfill a request of a user or detecting a suboptimal or inaccurate result provided by the other automated assistant in response to the request, in some implementations, an automated assistant offers to a user to handle the request that the other automated assistant failed to fulfill (or failed to optimally/accurately fulfill) and, if requested, provides a response that fulfills the request of the user.

In some implementations, an automated assistant may be ambiently aware of user interactions with other automated assistants (e.g., that are running on the same client device and/or another client device that is located nearby) and offer to handle a user's request in response to one of the other automated assistants failing to fulfill the user's request. In some implementations, the offer to handle the user's request may be conditioned on the automated assistant determining that there is a sufficiently high likelihood that the automated assistant can provide a response that fulfills the user's request. In other implementations (e.g., in response to a user specifying through a setting that the automated assistant should automatically respond to failures), the automated assistant may automatically provide a response that fulfills the user's request, in response to one of the other automated assistants failing to fulfill the user's request.

In an example, a user may direct a request to a first automated assistant, such as "OK Assistant 1, where can I find socks to buy nearby?" The first automated assistant may respond, "Sorry, I don't know what stores are around you." In this example, the first automated assistant has failed to fulfill the user's request. Had the user initially directed the request to the second automated assistant, the second automated assistant may have responded with, "Here's a list of stores that sell socks near you. Do you need directions to one of them?"

Continuing with the example, the second automated assistant detects the failure of the first automated assistant to fulfill the user's request. In response to detecting the failure, the second automated assistant may automatically provide a response that fulfills the user's request, such as, "I can help—here's a list of nearby stores." Alternatively, instead of automatically providing a response that fulfills the user's request, the second automated assistant may automatically provide an indication of availability of the response that fulfills the request of the user, e.g., by using a light or a display of a client device on which the second automated assistant is executing, or by playing a sound (e.g., a chime) on speakers of the client device on which the second automated assistant is executing.

In some implementations, a user invokes a first automated assistant via hotword or by another mechanism on a device, e.g., by asking "OK Assistant 1, what's the best place to eat nearby?" The first automated assistant can perform query processing, e.g., by running a DSP-powered hotword detector, then passing the audio for speech recognition and running the transcription of the audio through query interpretation and fulfillment.

In some implementations, when the query is issued to the first automated assistant, the user's utterance can be cached locally for further processing on the device where the second automated assistant runs. In some implementations, only the user input is cached, while in other implementations, the response of the first automated assistant is cached in addition to the user input. In a case where both the first automated assistant and the second automated assistant are running on the same device, the caching may be performed at the layer of meta assistant software running on the device. In a case where the first automated assistant and the second automated assistant are not running on the same device, the second automated assistant may detect the query directed to the first automated assistant (e.g. using a hotword model that detects the first automated assistant's hotword(s) or using always-on ASR).

In some implementations, if the two automated assistants are located on the same device, the meta assistant may enable failover from the first automated assistant to the second automated assistant. The meta assistant may provide the second automated assistant with access to the audio including the user input and/or other features derived from the audio such as the automatic speech recognition (ASR) transcription, either on demand (i.e., in the event of query failure) or in parallel with the first automated assistant. The meta assistant may also provide the second automated assistant with access to the response of the first automated assistant.

In some implementations, if the two automated assistants are located on different devices, there may not be a direct communication interface available between the second automated assistant and a shared software stack or a meta assistant. In this case, the detection and reaction may happen independently on the software stack for the second automated assistant. In some implementations, the second automated assistant may determine when to start processing the query (e.g., preemptively, before observing whether or not the first automated assistant failed, so that it can step in with a low latency). The second automated assistant may independently determine that the user triggered the first automated assistant for a query, e.g. by listening for the same hotword(s) or having an always-on speech recognition system which can detect user-assistant interactions. The second automated assistant may also use speaker identification to distinguish between the user's voice and the first automated assistant's voice and identify the failed fulfillment of the user's query in its software stack instead of within the shared software stack.

In some implementations, a shared interface may be provided where the main processing stack knows whether fulfillment of the user's query succeeded or not after the first automated assistant finished handling it. If it succeeded, then the second automated assistant does not need to take any further action. On the other hand, if it did not succeed, then the meta assistant may provide the cached audio (or other cached results such as the interpretation) to the second automated assistant. In some implementations, detection of whether or not a query succeeded can also be done automatically by listening to the response provided and inferring whether it is a mishandled query. For example, the stack can leverage speaker identification for text-to-speech audio from the first automated assistant, extract the corresponding audio response, and process it through a generic ASR system then a final NLU-based classification system (e.g., neural network based or heuristic based) which interprets answer such as "Sorry I can't help with that" as failures of the first automated assistant.

In other implementations, the second automated assistant can process the user's utterance in parallel with the first automated assistant and have an answer ready for the user query in case the first automated assistant fails to successfully respond to the query or returns a suboptimal or inaccurate result in response to the query. The second automated assistant can provide an answer to the query at the point where the second automated assistant determines that the first automated assistant fails to successfully respond to the query or returns a suboptimal or inaccurate result in response to the request. In some implementations, the second automated assistant may step in and provide an answer to the query prior to determining that the first automated assistant fails to successfully respond to the query or returns a suboptimal or inaccurate result in response to the request (e.g., in response to the meta assistant determining that the second automated assistant should take over from the first automated assistant and respond to the query).

In some implementations, the second automated assistant may passively detect both user input as well answers provided by the first automated assistant, in order to enable the second automated assistant to step in and provide an answer in a multi-turn dialog where the failure may happen after a number of interactions. In some implementations, the second automated assistant may also respond when it is able to supplement a response to a query provided by the first automated assistant.

In various implementations, a method implemented by one or more processors may include: executing a first automated assistant in an inactive state at least in part on a computing device operated by a user; while in the inactive state, determining, by the first automated assistant, that a second automated assistant failed to fulfill a request of the user; in response to determining that the second automated assistant failed to fulfill the request of the user, the first automated assistant processing cached audio data that captures a spoken utterance of the user including the request that the second automated assistant failed to fulfill, or features of the cached audio data, to determine a response that fulfills the request of the user; and providing, by the first automated assistant to the user, the response that fulfills the request of the user.

In some implementations, determining that the second automated assistant failed to fulfill the request of the user may include: receiving audio data that captures an initial response; and using speaker identification on the audio data that captures the initial response to determine that the initial response is provided by the second automated assistant. In some implementations, determining that the second automated assistant failed to fulfill the request of the user may further include processing the audio data that captures the initial response using a hotword detection model to determine that the initial response does not fulfill the request of the user. In some implementations, determining that the second automated assistant failed to fulfill the request of the user may further include: processing the audio data that captures the initial response using automatic speech recognition to generate text; and processing the text using natural language processing techniques to determine that the initial response does not fulfill the request of the user.

In some implementations, the cached audio data further captures an initial response provided by the second automated assistant to the user. In some implementations, the second automated assistant is executed on the computing device, and the cached audio data is received by the first automated assistant via a meta assistant that is executed on the computing device. In some implementations, the second automated assistant is executed on another computing device, and the cached audio data is received by the first automated assistant via one or more microphones of the computing device.

In some implementations, the first automated assistant causes the response that fulfills the request of the user to be provided on another computing device. In some implementations, the first automated assistant causes the response that fulfills the request of the user to be displayed on a display of the computing device.

In some additional or alternative implementations, a computer program product may include one or more computer-readable storage media having program instructions collectively stored on the one or more computer-readable storage media. The program instructions may be executable to: execute a first automated assistant in an inactive state at least in part on a computing device operated by a user; while in the inactive state, determine, by the first automated assistant, that a second automated assistant failed to fulfill a request of the user; in response to determining that the second automated assistant failed to fulfill the request of the user, process, by the first automated assistant, cached audio data that captures a spoken utterance of the user including the request that the second automated assistant failed to fulfill, or features of the cached audio data, to determine a response that fulfills the request of the user; and provide, by the first automated assistant to the user, an indication of availability of the response that fulfills the request of the user.

In some implementations, the indication of availability is a visual indication provided by the computing device. In some implementations, the program instructions are further executable to: receive, by the first automated assistant, a request for the response that fulfills the request of the user; and in response to receiving the request for the response that fulfills the request of the user, provide, by the first automated assistant to the user, the response that fulfills the request of the user.

In some additional or alternative implementations, a system may include a processor, a computer-readable memory, one or more computer-readable storage media, and program instructions collectively stored on the one or more computer-readable storage media. The program instructions may be executable to: execute a first automated assistant in an inactive state at least in part on a computing device operated by a user; while in the inactive state, determine, by the first automated assistant, that a second automated assistant failed to fulfill a request of the user; in response to determining that the second automated assistant failed to fulfill the request of the user, provide an indication to the user that the first automated assistant is available to fulfill the request of the user; in response to receiving from the user an instruction to fulfill the request, process, by the first automated assistant, cached audio data that captures a spoken utterance of the user including the request that the second automated assistant failed to fulfill, or features of the cached audio data, to determine a response that fulfills the request of the user; and provide, by the first automated assistant to the user, the response that fulfills the request of the user.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Figure 1A:
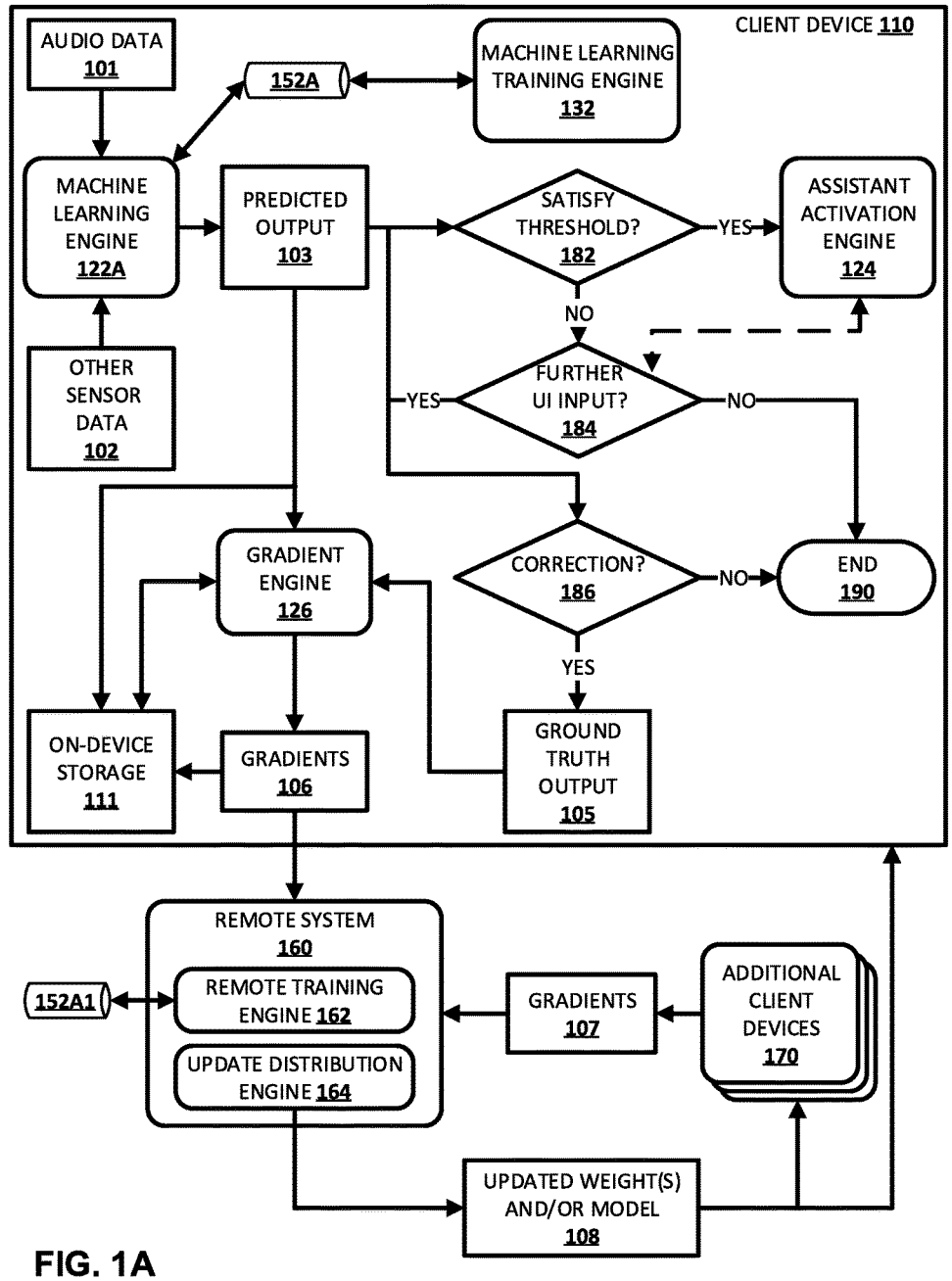
FIG. 1A and FIG. 1B depict example process flows that demonstrate various aspects of the present disclosure, in accordance with various implementations.
Figure 1B:
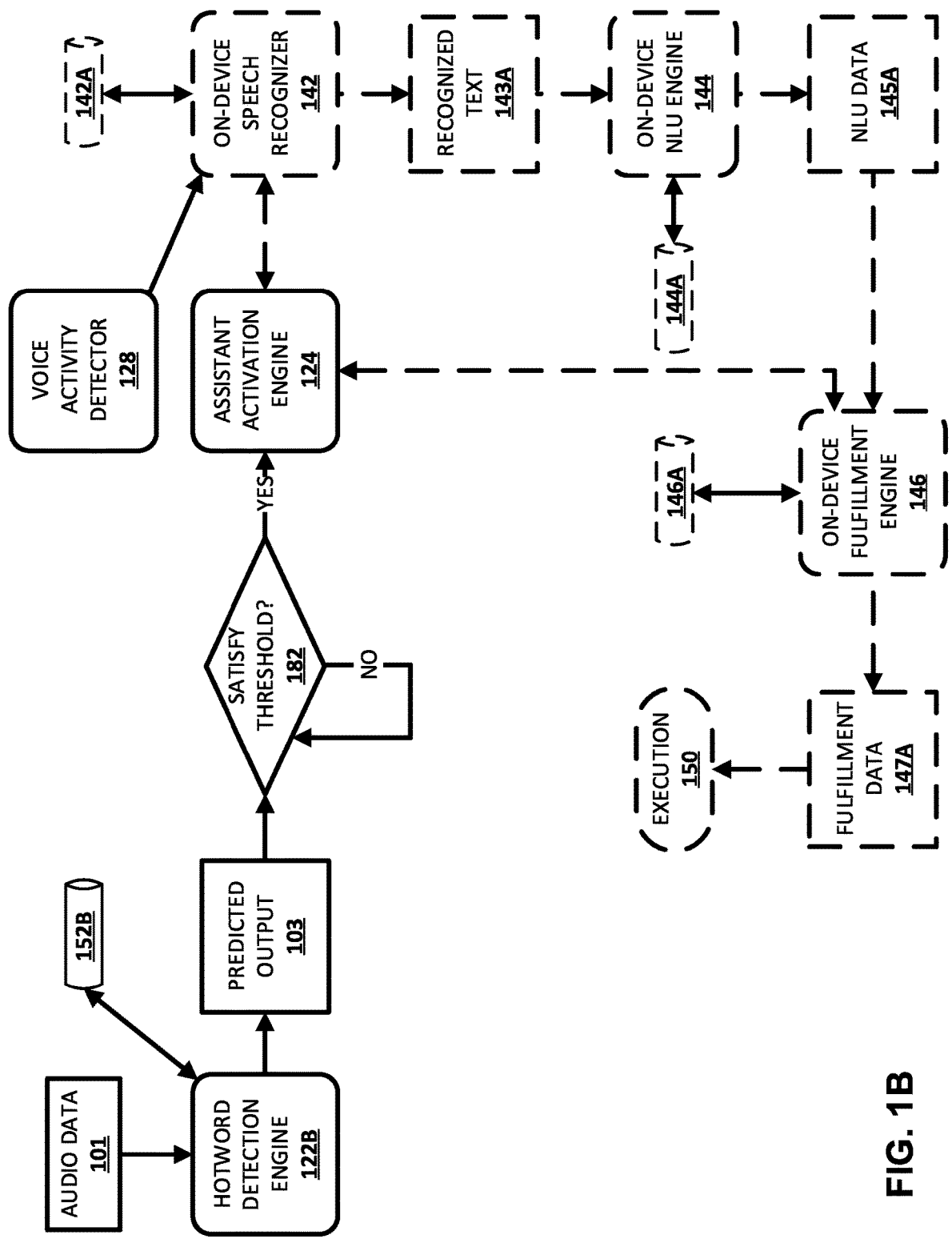

FIGS. 1A and 1B depict example process flows that demonstrate various aspects of the present disclosure. A client device 110 is illustrated in FIG. 1A, and includes the components that are encompassed within the box of FIG. 1A that represents the client device 110. Machine learning engine 122A can receive audio data 101 corresponding to a spoken utterance detected via one or more microphones of the client device 110 and/or other sensor data 102 corresponding to utterance free physical movement(s) (e.g., hand gesture(s) and/or movement(s), body gesture(s) and/or body movement(s), eye gaze, facial movement, mouth movement, etc.) detected via one or more non-microphone sensor components of the client device 110. The one or more non-microphone sensors can include camera(s) or other vision sensor(s), proximity sensor(s), pressure sensor(s), accelerometer(s), magnetometer(s), and/or other sensor(s). The machine learning engine 122A processes the audio data 101 and/or the other sensor data 102, using machine learning model 152A, to generate a predicted output 103. As described herein, the machine learning engine 122A can be a hotword detection engine 122B or an alternative engine, such as a voice activity detector (VAD) engine, an endpoint detector engine, and/or other engine(s).

In some implementations, when the machine learning engine 122A generates the predicted output 103, it can be stored locally on the client device in on-device storage 111, and optionally in association with the corresponding audio data 101 and/or the other sensor data 102. In some versions of those implementations, the predicted output can be retrieved by gradient engine 126 for utilization in generating a set of gradients 106 (e.g., based on comparing the predicted output to ground truth output) at a later time, such as when one or more conditions described herein are satisfied. The on-device storage 111 can include, for example, read-only memory (ROM) and/or random-access memory (RAM). In other implementations, the predicted output 103 can be provided to the gradient engine 126 in real-time.

The client device 110 can make a decision, based on determining whether the predicted output 103 satisfies a threshold at block 182, of whether to initiate currently dormant automated assistant function(s) (e.g., automated assistant 295 of FIG. 2), refrain from initiating currently dormant automated assistant function(s), and/or shut down currently active automated assistant function(s) using an assistant activation engine 124. The automated assistant functions can include: speech recognition to generate recognized text, natural language understanding (NLU) to generate NLU output, generating a response based on the recognized text and/or the NLU output, transmission of the audio data to a remote server, and/or transmission of the recognized text to the remote server. For example, assume the predicted output 103 is a probability (e.g., 0.80 or 0.90) and the threshold at block 182 is a threshold probability (e.g., 0.85), if the client device 110 determines the predicted output 103 (e.g., 0.90) satisfies the threshold (e.g., 0.85) at block 182, then the assistant activation engine 124 can initiate the currently dormant automated assistant function(s).

In some implementations, and as depicted in FIG. 1B, the machine learning engine 122A can be a hotword detection engine 122B. Notably, various automated assistant function(s), such as on-device speech recognizer 142, on-device NLU engine 144, and/or on-device fulfillment engine 146, are currently dormant (i.e., as indicated by dashed lines). Further, assume that the predicted output 103, generated using a hotword detection model 152B and based on the audio data 101, satisfies the threshold at block 182, and that voice activity detector 128 detects user speech directed to the client device 110.

In some versions of these implementations, the assistant activation engine 124 activates the on-device speech recognizer 142, the on-device NLU engine 144, and/or the on-device fulfillment engine 146 as the currently dormant automated assistant function(s). For example, the on-device speech recognizer 142 can process the audio data 101 for a spoken utterance, including a hotword "OK Assistant" and additional commands and/or phrases that follow the hotword "OK Assistant", using on-device speech recognition model 142A, to generate recognized text 143A, the on-device NLU engine 144 can process the recognized text 143A, using on-device NLU model 144A, to generate NLU data 145A, the on-device fulfillment engine 146 can process the NLU data 145A, using on-device fulfillment model 146A, to generate fulfillment data 147A, and the client device 110 can use the fulfillment data 147A in execution 150 of one or more actions that are responsive to the audio data 101.

In other versions of these implementations, the assistant activation engine 124 activates the only on-device fulfillment engine 146, without activating the on-device speech recognizer 142 and the on-device NLU engine 144, to process various commands, such as "No", "Stop", "Cancel", and/or other commands that can be processed without the on-device speech recognizer 142 and the on-device NLU engine 144. For example, the on-device fulfillment engine 146 processes the audio data 101, using the on-device fulfillment model 146A, to generate the fulfillment data 147A, and the client device 110 can use the fulfillment data 147A in execution 150 of one or more actions that are responsive to the audio data 101. Moreover, in versions of these implementations, the assistant activation engine 124 can initially activate the currently dormant automated function(s) to verify the decision made at block 182 was correct (e.g., the audio data 101 does in fact include the hotword "OK Assistant") by initially only activating the on-device speech recognizer 142 to determine the audio data 101 include the hotword "OK Assistant", and/or the assistant activation engine 124 can transmit the audio data 101 to one or more servers (e.g., remote server 160) to verify the decision made at block 182 was correct (e.g., the audio data 101 does in fact include the hotword "OK Assistant").

Turning back to FIG. 1A, if the client device 110 determines the predicted output 103 (e.g., 0.80) fails to satisfy the threshold (e.g., 0.85) at block 182, then the assistant activation engine 124 can refrain from initiating the currently dormant automated assistant function(s) and/or shut down any currently active automated assistant function(s). Further, if the client device 110 determines the predicted output 103 (e.g., 0.80) fails to satisfy the threshold (e.g., 0.85) at block 182, then the client device 110 can determine if further user interface input is received at block 184. For example, the further user interface input can be an additional spoken utterance that includes a hotword, additional utterance free physical movement(s) that serve as a proxy for a hotword, actuation of an explicit automated assistant invocation button (e.g., a hardware button or software button), a sensed "squeeze" of the client device 110 device (e.g., when squeezing the client device 110 with at least a threshold amount of force invokes the automated assistant), and/or other explicit automated assistant invocation. If the client device 110 determines there is no further user interface input received at block 184, then the client device 110 can stop identifying corrections and end at block 190.

However, if the client device 110 determines there is further user interface input received at block 184, then the system can determine whether the further user interface input received at block 184 includes correction(s) at block 186 that contradict the decision made at block 182 (e.g., user-mediated or user-provided corrections). If the client device 110 determines the further user interface input received at block 184 does not include a correction at block 186, the client device 110 can stop identifying corrections and end at block 190. However, if the client device 110 determines that the further user interface input received at block 184 includes a correction at block 186 that contradicts the initial decision made at block 182, then the client device 110 can determine ground truth output 105.

In some implementations, the gradient engine 126 can generate the gradients 106 based on the predicted output 103 to the ground truth output 105. For example, the gradient engine 126 can generate the gradients 106 based on comparing the predicted output 103 to the ground truth output 105. In some versions of those implementations, the client device 110 stores, locally in the on-device storage 111, the predicted output 103 and the corresponding ground truth output 105, and the gradient engine 126 retrieves the predicted output 103 and the corresponding ground truth output 105 to generate the gradients 106 when one or more conditions are satisfied. The one or more conditions can include, for example, that the client device is charging, that the client device has at least a threshold state of charge, that a temperature of the client device (based on one or more on-device temperature sensors) is less than a threshold, and/or that the client device is not being held by a user. In other versions of those implementations, the client device 110 provides the predicted output 103 and the ground truth output 105 to the gradient engine 126 in real-time, and the gradient engine 126 generates the gradients 106 in real-time.

Moreover, the gradient engine 126 can provide the generated gradients 106 to on-device machine learning training engine 132A. The on-device machine learning training engine 132A, when it receives the gradients 106, uses the gradients 106 to update the on-device machine learning model 152A. For example, the on-device machine learning training engine 132A can utilize backpropagation and/or other techniques to update the on-device machine learning model 152A. It is noted that, in some implementations, the on-device machine learning training engine 132A can utilize batch techniques to update the on-device machine learning model 152A based on the gradients 106 and additional gradients determined locally at the client device 110 on the basis of additional corrections.

Further, the client device 110 can transmit the generated gradients 106 to a remote system 160. When the remote system 160 receives the gradients 106, a remote training engine 162 of the remote system 160 uses the gradients 106, and additional gradients 107 from additional client devices 170, to update global weights of a global speech recognition model 152A1. The additional gradients 107 from the additional client devices 170 can each be generated based on the same or similar technique as described above with respect to the gradients 106 (but on the basis of locally identified corrections that are particular to those client devices).

An update distribution engine 164 can, responsive to one or more conditions being satisfied, provide, to the client device 110 and/or other client device(s), the updated global weights and/or the updated global speech recognition model itself, as indicated by 108. The one or more conditions can include, for example, a threshold duration and/or quantity of training since updated weights and/or an updated speech recognition model was last provided. The one or more conditions can additionally or alternatively include, for example, a measured improvement to the updated speech recognition model and/or passage of a threshold duration of time since updated weights and/or an updated speech recognition model was last provided. When the updated weights are provided to the client device 110, the client device 110 can replace weights, of the on-device machine learning model 152A, with the updated weights. When the updated global speech recognition model is provided to the client device 110, the client device 110 can replace the on-device machine learning model 152A with the updated global speech recognition model.

In some implementations, the on-device machine learning model 152A is transmitted (e.g., by the remote system 160 or other component(s)) for storage and use at the client device 110, based on a geographic region and/or other properties of the client device 110 and/or a user of the client device 110. For example, the on-device machine learning model 152A can be one of N available machine learning models for a given language, but can be trained based on corrections that are specific to a particular geographic region and provided to client device 110 based on the client device 110 being primarily located in the particular geographic region.

Figure 2:
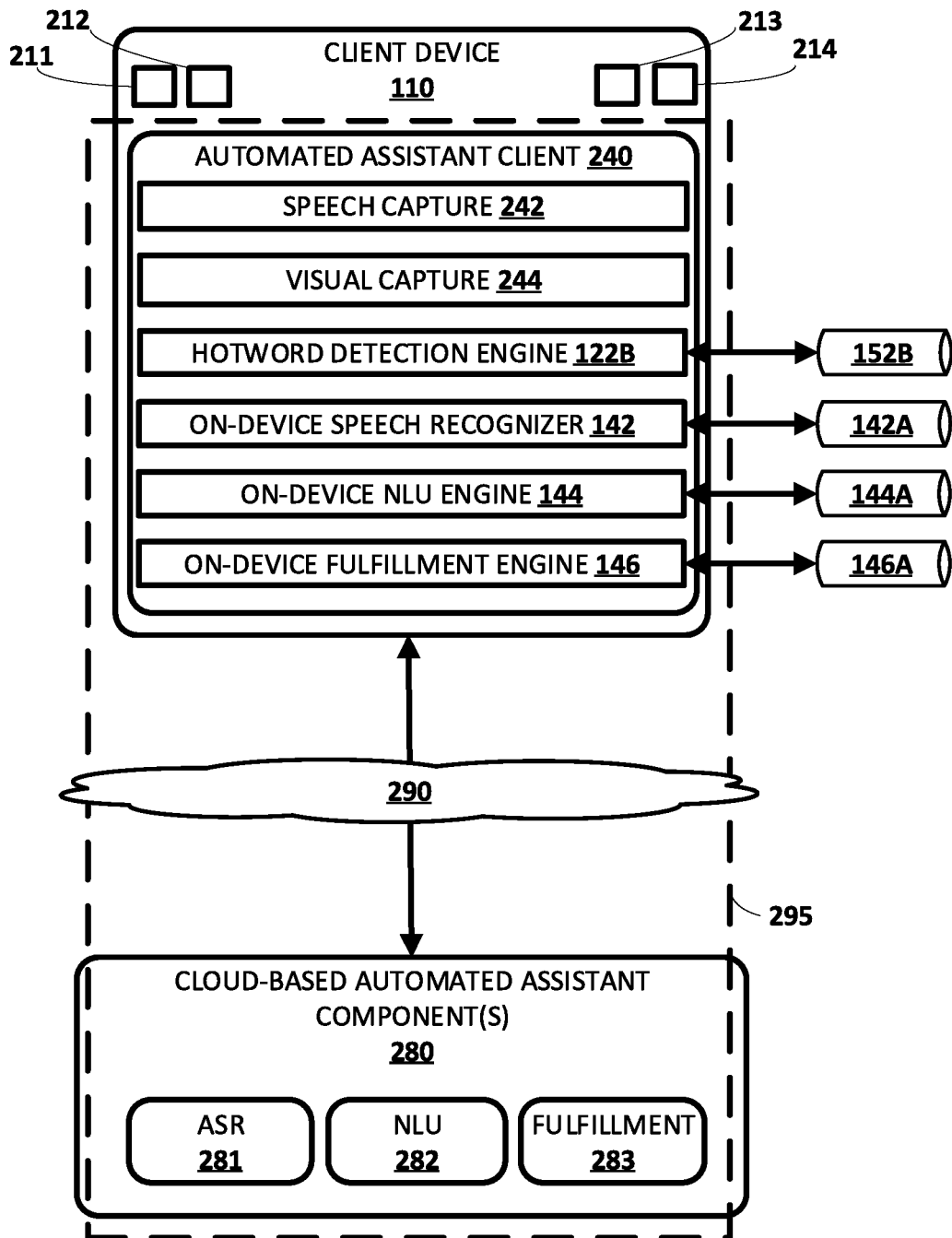
FIG. 2 depicts a block diagram of an example environment that includes various components from FIGS. 1A and 1B, and in which implementations disclosed herein may be implemented.

Turning now to FIG. 2, client device 110 is illustrated in an implementation where the various on-device machine learning engines of FIGS. 1A and 1B are included as part of (or in communication with) one or more automated assistant clients 240 (e.g., a first automated assistant, a second automated assistant, and a meta assistant). The respective machine learning models are also illustrated interfacing with the various on-device machine learning engines of FIGS. 1A and 1B. Other components from FIGS. 1A and 1B are not illustrated in FIG. 2 for simplicity. FIG. 2 illustrates one example of how the various on-device machine learning engines of FIGS. 1A and 1B and their respective machine learning models can be utilized by the automated assistant client(s) 240 in performing various actions.

The client device 110 in FIG. 2 is illustrated with one or more microphones 211, one or more speakers 212, one or more cameras and/or other vision components 213, and display(s) 214 (e.g., a touch-sensitive display). The client device 110 may further include pressure sensor(s), proximity sensor(s), accelerometer(s), magnetometer(s), and/or other sensor(s) that are used to generate other sensor data that is in addition to audio data captured by the one or more microphones 211. The client device 110 at least selectively executes the automated assistant client 240. The automated assistant client 240 includes, in the example of FIG. 2, the on-device hotword detection engine 122B, the on-device speech recognizer 142, the on-device natural language understanding (NLU) engine 144, and the on-device fulfillment engine 146. The automated assistant client 240 further includes speech capture engine 242 and visual capture engine 244. The automated assistant client 140 can include additional and/or alternative engines, such as a voice activity detector (VAD) engine, an endpoint detector engine, and/or other engine(s). In some implementations, one or more instances of the automated assistant client 240 may omit one or more of the elements shown in FIG. 2.

One or more cloud-based automated assistant components 280 can optionally be implemented on one or more computing systems (collectively referred to as a "cloud" computing system) that are communicatively coupled to client device 110 via one or more local and/or wide area networks (e.g., the Internet) indicated generally at 290. The cloud-based automated assistant components 280 can be implemented, for example, via a cluster of high-performance servers.

In various implementations, an instance of an automated assistant client 240, by way of its interactions with one or more cloud-based automated assistant components 280, may form what appears to be, from a user's perspective, a logical instance of an automated assistant 295 with which the user may engage in a human-to-computer interactions (e.g., spoken interactions, gesture-based interactions, and/or touch-based interactions).

The client device 110 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided.

The one or more vision components 213 can take various forms, such as monographic cameras, stereographic cameras, a LIDAR component (or other laser-based component(s)), a radar component, etc. The one or more vision components 213 may be used, e.g., by the visual capture engine 242, to capture vision frames (e.g., image frames, laser-based vision frames) of an environment in which the client device 110 is deployed. In some implementations, such vision frame(s) can be utilized to determine whether a user is present near the client device 110 and/or a distance of the user (e.g., the user's face) relative to the client device 110. Such determination(s) can be utilized, for example, in determining whether to activate the various on-device machine learning engines depicted in FIG. 2, and/or other engine(s).

Speech capture engine 242 can be configured to capture user's speech and/or other audio data captured via microphone(s) 211. Further, the client device 110 may include pressure sensor(s), proximity sensor(s), accelerometer(s), magnetometer(s), and/or other sensor(s) that are used to generate other sensor data that is in addition to the audio data captured via the microphone(s) 211. As described herein, such audio data and other sensor data can be utilized by the hotword detection engine 122B and/or other engine(s) to determine whether to initiate one or more currently dormant automated assistant functions, refrain from initiating one or more currently dormant automated assistant functions, and/or shut down one or more currently active automated assistant functions. The automated assistant functions can include the on-device speech recognizer 142, the on-device NLU engine 144, the on-device fulfillment engine 146, and additional and/or alternative engines. For example, on-device speech recognizer 142 can process audio data that captures a spoken utterance, utilizing on-device speech recognition model 142A, to generate recognized text 143A that corresponds to the spoken utterance. On-device NLU engine 144 performs on-device natural language understanding, optionally utilizing on-device NLU model 144A, on the recognized text 143A to generate NLU data 145A. The NLU data 145A can include, for example, intent(s) that correspond to the spoken utterance and optionally parameter(s) (e.g., slot values) for the intent(s). Further, the on-device fulfillment engine 146 generates the fulfillment data 147A, optionally utilizing on-device fulfillment model 146A, based on the NLU data 145A. This fulfillment data 147A can define local and/or remote responses (e.g., answers) to the spoken utterance, interaction(s) to perform with locally installed application(s) based on the spoken utterance, command(s) to transmit to Internet-of-things (IoT) device(s) (directly or via corresponding remote system(s)) based on the spoken utterance, and/or other resolution action(s) to perform based on the spoken utterance. The fulfillment data 147A is then provided for local and/or remote performance/execution of the determined action(s) to resolve the spoken utterance. Execution can include, for example, rendering local and/or remote responses (e.g., visually and/or audibly rendering (optionally utilizing a local text-to-speech module)), interacting with locally installed applications, transmitting command(s) to IoT device(s), and/or other action(s).

Display(s) 214 can be utilized to display the recognized text 143A and/or the further recognized text 143B from the on-device speech recognizer 122, and/or one or more results from the execution 150. Display(s) 214 can further be one of the user interface output component(s) through which visual portion(s) of a response, from the automated assistant client 240, is rendered.

In some implementations, cloud-based automated assistant component(s) 280 can include a remote ASR engine 281 that performs speech recognition, a remote NLU engine 282 that performs natural language understanding, and/or a remote fulfillment engine 283 that generates fulfillment. A remote execution module can also optionally be included that performs remote execution based on local or remotely determined fulfillment data. Additional and/or alternative remote engines can be included. As described herein, in various implementations on-device speech processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, one or more cloud-based automated assistant component(s) 280 can be utilized at least selectively. For example, such component(s) can be utilized in parallel with on-device component(s) and output from such component(s) utilized when local component(s) fail. For example, the on-device fulfillment engine 146 can fail in certain situations (e.g., due to relatively limited resources of client device 110) and remote fulfillment engine 283 can utilize the more robust resources of the cloud to generate fulfillment data in such situations. The remote fulfillment engine 283 can be operated in parallel with the on-device fulfillment engine 146 and its results utilized when on-device fulfillment fails, or can be invoked responsive to determining failure of the on-device fulfillment engine 146.

In various implementations, an NLU engine (on-device and/or remote) can generate NLU data that includes one or more annotations of the recognized text and one or more (e.g., all) of the terms of the natural language input. In some implementations an NLU engine is configured to identify and annotate various types of grammatical information in natural language input. For example, an NLU engine may include a morphological module that may separate individual words into morphemes and/or annotate the morphemes, e.g., with their classes. An NLU engine may also include a part of speech tagger configured to annotate terms with their grammatical roles. Also, for example, in some implementations an NLU engine may additionally and/or alternatively include a dependency parser configured to determine syntactic relationships between terms in natural language input.

In some implementations, an NLU engine may additionally and/or alternatively include an entity tagger configured to annotate entity references in one or more segments such as references to people (including, for instance, literary characters, celebrities, public figures, etc.), organizations, locations (real and imaginary), and so forth. In some implementations, an NLU engine may additionally and/or alternatively include a coreference resolver (not depicted) configured to group, or "cluster," references to the same entity based on one or more contextual cues. In some implementations, one or more components of an NLU engine may rely on annotations from one or more other components of the NLU engine.

An NLU engine may also include an intent matcher that is configured to determine an intent of a user engaged in an interaction with automated assistant 295. An intent matcher can use various techniques to determine an intent of the user. In some implementations, an intent matcher may have access to one or more local and/or remote data structures that include, for instance, a plurality of mappings between grammars and responsive intents. For example, the grammars included in the mappings can be selected and/or learned over time, and may represent common intents of users. For example, one grammar, "play <artist>", may be mapped to an intent that invokes a responsive action that causes music by the <artist> to be played on the client device 110. Another grammar, "[weather|forecast] today," may be matchable to user queries such as "what's the weather today" and "what's the forecast for today?" In addition to or instead of grammars, in some implementations, an intent matcher can employ one or more trained machine learning models, alone or in combination with one or more grammars. These trained machine learning models can be trained to identify intents, e.g., by embedding recognized text from a spoken utterance into a reduced dimensionality space, and then determining which other embeddings (and therefore, intents) are most proximate, e.g., using techniques such as Euclidean distance, cosine similarity, etc. As seen in the "play <artist>" example grammar above, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Other slot value(s) can be inferred based on, for example, user location, currently rendered content, user preferences, and/or other cue(s).

A fulfillment engine (local and/or remote) can be configured to receive the predicted/estimated intent that is output by an NLU engine, as well as any associated slot values and fulfill (or "resolve") the intent. In various implementations, fulfillment (or "resolution") of the user's intent may cause various fulfillment information (also referred to as fulfillment data) to be generated/obtained, e.g., by fulfillment engine. This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

Figure 3:
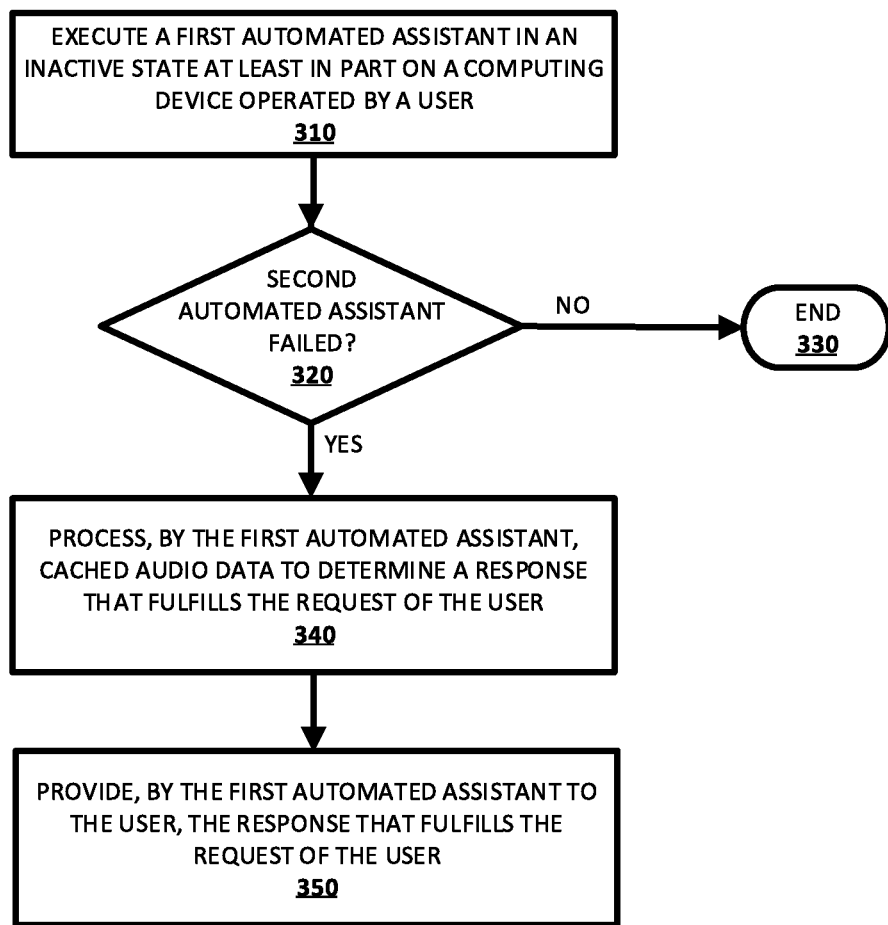
FIG. 3 depicts a flowchart illustrating an example method of detecting and handling failures in other automated assistants.

FIG. 3 depicts a flowchart illustrating an example method 300 of detecting and handling failures in other automated assistants. For convenience, the operations of the method 300 are described with reference to a system that performs the operations. This system of method 300 includes one or more processors and/or other component(s) of a client device. Moreover, while operations of the method 300 are shown in a particular order, this is not meant to be limiting. One or more operations may be reordered, omitted, or added.

At block 310, the system executes a first automated assistant in an inactive state at least in part on a computing device operated by a user (e.g., a client device).

At block 320, while in the inactive state, the first automated assistant determines whether or not a second automated assistant failed to fulfill a request of the user. In some implementations, a failure of the second automated assistant to fulfill the request of the user, detected at block 320, may include a response by the second automated assistant indicating that the user's request cannot be fulfilled (e.g., "Sorry", "I can't do that", etc.). In other implementations, the failure that is detected at block 320 may also include a response that the first automated assistant determines to be a suboptimal, inaccurate, or incomplete result provided by the second automated assistant in response to the user's request. In some implementations, the second automated assistant may be running on the client device alongside the first automated assistant. In other implementations, the second automated assistant may be running on another client device that is near the client device on which the first automated assistant is running (e.g., in the same room).

If, at an iteration of block 320, the first automated assistant determines that the second automated assistant did not fail to fulfill the request of the user, then the system proceeds to block 330, and the flow ends. On the other hand, if, at an iteration of block 320, the first automated assistant determines that the second automated assistant failed to fulfill the request of the user, then the system proceeds to block 340.

Still referring to block 320, in some implementations, in the determining whether or not the second automated assistant failed to fulfill the request of the user, the first automated assistant receives audio data that captures an initial response and then uses speaker identification on the audio data that captures the initial response to determine whether or not the initial response is provided by the second automated assistant (e.g., the initial response was spoken in a voice known to be associated with the second automated assistant). If the first automated assistant determines that the initial response was not provided by the second automated assistant, then the system proceeds to block 330, and the flow ends. On the other hand, if the first automated assistant determines that the initial response was provided by the second automated assistant, then the first automated assistant determines whether or not the initial response indicates a failure of the second automated assistant to fulfill the request of the user.

In some implementations, the first automated assistant processes the audio data that captures the initial response using a hotword detection model to determine whether or not the initial response fulfills the request of the user (e.g., by detecting failure hotwords such as "Sorry", "I can't do that", etc.). In other implementations, the first automated assistant processes the audio data that captures the initial response using automatic speech recognition to generate text and then processes the text using natural language processing techniques to determine whether or not the initial response fulfills the request of the user. In some implementations, natural language processing techniques are used to identify a suboptimal, inaccurate, or incomplete result, and on the basis of identifying a suboptimal, inaccurate, or incomplete result, the first automated assistant may determine that the initial response fails to fulfill the request of the user.

At block 340, in response to determining that the second automated assistant failed to fulfill the request of the user, the first automated assistant processes cached audio data that captures a spoken utterance of the user including the request that the second automated assistant failed to fulfill and/or processes features derived from the audio data (e.g., the ASR transcription) to determine a response that fulfills the request of the user. In some implementations, if, at block 340, the first automated assistant is unable to determine a response that fulfills the request of the user, then the system proceeds to block 330, and the flow ends. In some implementations, the cached audio data further captures an initial response provided by the second automated assistant to the user.

In some implementations, the second automated assistant is executed on the same computing device as the first automated assistant, and the cached audio data and/or features derived from the audio data (e.g., the ASR transcription) are received by the first automated assistant via a meta assistant that is executed on the computing device. In other implementations, the second automated assistant is executed on another computing device, and the cached audio data is received by the first automated assistant via one or more microphones of the computing device. In other implementations, the second automated assistant is executed on another computing device, and the first automated assistant receives the cached audio data and/or features derived from the audio data (e.g., the ASR transcription) via an application programming interface (API).

At block 350, the first automated assistant provides, to the user, the response that fulfills the request of the user (determined at blocked 340). In some implementations, the first automated assistant causes the response that fulfills the request of the user to be provided on the computing device on which the first automated assistant is executing (e.g., via the speakers or by displaying the response on a display of the computing device). In other implementations, the first automated assistant causes the response that fulfills the request of the user to be provided on another computing device (e.g., via speakers or a display).

Figure 4:
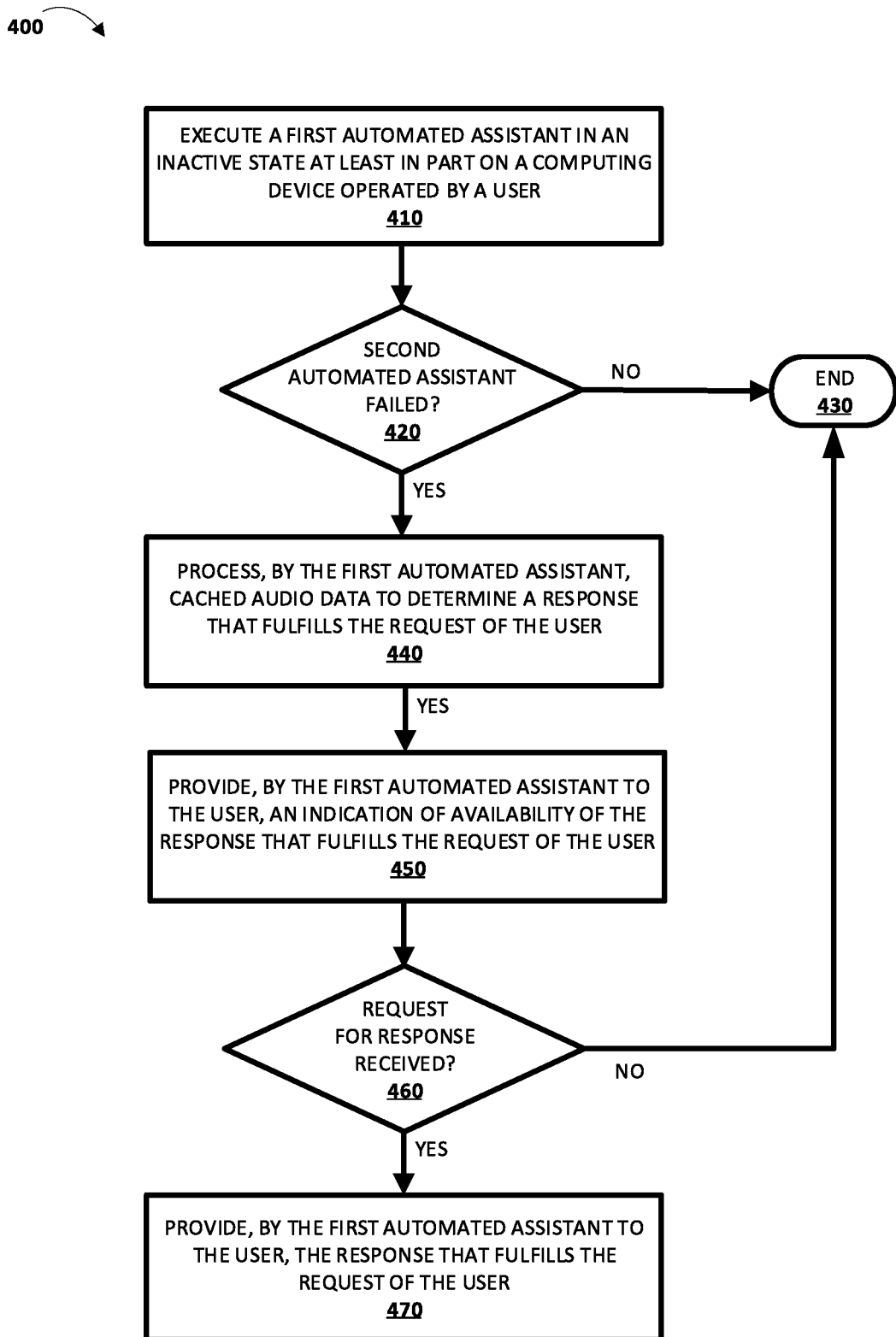
FIG. 4 depicts a flowchart illustrating an example method of detecting and handling failures in other automated assistants.

FIG. 4 depicts a flowchart illustrating an example method 400 of detecting and handling failures in other automated assistants. For convenience, the operations of the method 400 are described with reference to a system that performs the operations. This system of method 400 includes one or more processors and/or other component(s) of a client device. Moreover, while operations of the method 400 are shown in a particular order, this is not meant to be limiting. One or more operations may be reordered, omitted, or added.

At block 410, the system executes a first automated assistant in an inactive state at least in part on a computing device operated by a user (e.g., a client device).

At block 420, while in the inactive state, the first automated assistant determines whether or not a second automated assistant failed to fulfill a request of the user. In some implementations, a failure of the second automated assistant to fulfill the request of the user, detected at block 420, may include a response by the second automated assistant indicating that the user's request cannot be fulfilled (e.g., "Sorry", "I can't do that", etc.). In other implementations, the failure that is detected at block 420 may also include a response that the first automated assistant determines to be a suboptimal, inaccurate, or incomplete result provided by the second automated assistant in response to the user's request. In some implementations, the second automated assistant may be running on the client device alongside the first automated assistant. In other implementations, the second automated assistant may be running on another client device that is near the client device on which the first automated assistant is running (e.g., in the same room).

If, at an iteration of block 420, the first automated assistant determines that the second automated assistant did not fail to fulfill the request of the user, then the system proceeds to block 430, and the flow ends. On the other hand, if, at an iteration of block 420, the first automated assistant determines that the second automated assistant failed to fulfill the request of the user, then the system proceeds to block 440.

Still referring to block 420, in some implementations, in the determining whether or not the second automated assistant failed to fulfill the request of the user, the first automated assistant receives audio data that captures an initial response and then uses speaker identification on the audio data that captures the initial response to determine whether or not the initial response is provided by the second automated assistant. If the first automated assistant determines that the initial response was not provided by the second automated assistant, then the system proceeds to block 430, and the flow ends. On the other hand, if the first automated assistant determines that the initial response was provided by the second automated assistant, then the first automated assistant determines whether or not the initial response indicates a failure of the second automated assistant to fulfill the request of the user.

In some implementations, the first automated assistant processes the audio data that captures the initial response using a hotword detection model to determine whether or not the initial response fulfills the request of the user (e.g., by detecting failure hotwords such as "Sorry", "I can't do that", etc.). In other implementations, the first automated assistant processes the audio data that captures the initial response using automatic speech recognition to generate text and then processes the text using natural language processing techniques to determine whether or not the initial response fulfills the request of the user.

At block 440, in response to determining that the second automated assistant failed to fulfill the request of the user, the first automated assistant processes cached audio data that captures a spoken utterance of the user including the request that the second automated assistant failed to fulfill and/or processes features derived from the audio data (e.g., the ASR transcription) to determine a response that fulfills the request of the user. In some implementations, if, at block 440, the first automated assistant is unable to determine a response that fulfills the request of the user, then the system proceeds to block 430, and the flow ends. In some implementations, the cached audio data further captures an initial response provided by the second automated assistant to the user.

In some implementations, the second automated assistant is executed on the same computing device as the first automated assistant, and the cached audio data and/or features derived from the audio data (e.g., the ASR transcription) are received by the first automated assistant via a meta assistant that is executed on the computing device. In other implementations, the second automated assistant is executed on another computing device, and the cached audio data is received by the first automated assistant via one or more microphones of the computing device. In other implementations, the second automated assistant is executed on another computing device, and the first automated assistant receives the cached audio data and/or features derived from the audio data (e.g., the ASR transcription) via an application programming interface (API).

At block 450, the first automated assistant provides, to the user, an indication of availability of the response that fulfills the request of the user. In some implementations, the indication of availability is a visual indication (e.g., an indication on a display or a light) and/or an audio indication (e.g., a chime) provided by the computing device on which the first automated assistant is executing.

At block 460, the first automated assistant determines whether or not a request for the response that fulfills the request of the user is received (e.g., from the user). If, at an iteration of block 460, the first automated assistant determines that the request for the response that fulfills the request of the user has not been received, then the system proceeds to block 430, and the flow ends. On the other hand, if, at an iteration of block 460, the first automated assistant determines that the request for the response that fulfills the request of the user has been received, then the system proceeds to block 470.

At block 470, in response to receiving the request for the response that fulfills the request of the user, the first automated assistant provides the response that fulfills the request of the user (determined at blocked 440). In some implementations, the first automated assistant causes the response that fulfills the request of the user to be provided on the computing device on which the first automated assistant is executing (e.g., via the speakers or by displaying the response on a display of the computing device). In other implementations, the first automated assistant causes the response that fulfills the request of the user to be provided on another computing device (e.g., via speakers or a display).

Figure 5:
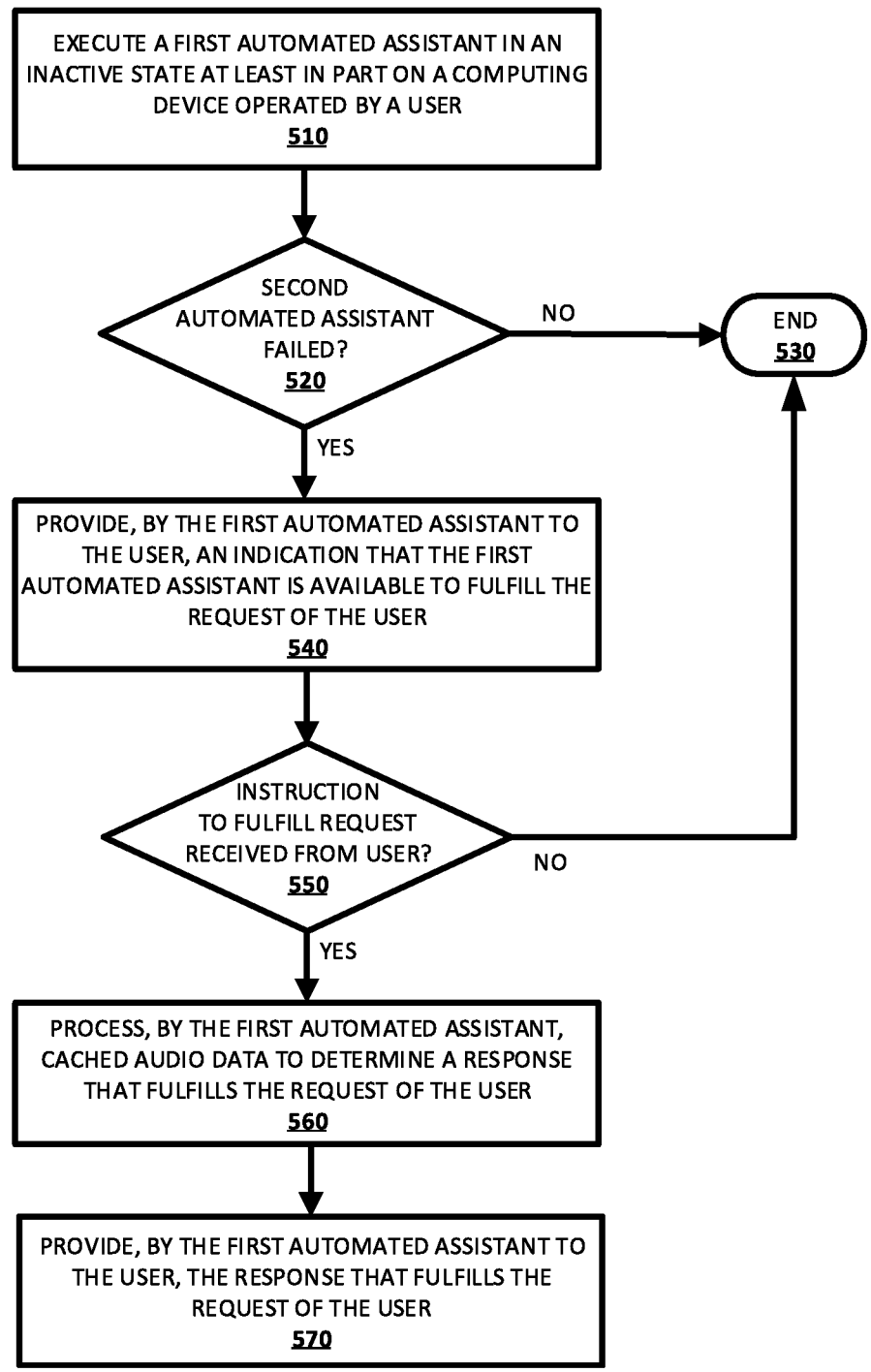
FIG. 5 depicts a flowchart illustrating an example method of detecting and handling failures in other automated assistants.

FIG. 5 depicts a flowchart illustrating an example method 500 of detecting and handling failures in other automated assistants. For convenience, the operations of the method 500 are described with reference to a system that performs the operations. This system of method 500 includes one or more processors and/or other component(s) of a client device. Moreover, while operations of the method 500 are shown in a particular order, this is not meant to be limiting. One or more operations may be reordered, omitted, or added.

At block 510, the system executes a first automated assistant in an inactive state at least in part on a computing device operated by a user (e.g., a client device).

At block 520, while in the inactive state, the first automated assistant determines whether or not a second automated assistant failed to fulfill a request of the user. In some implementations, a failure of the second automated assistant to fulfill the request of the user that is detected at block 520 may include a response by the second automated assistant indicating that the user's request cannot be fulfilled (e.g., "Sorry", "I can't do that", etc.). In other implementations, the failure that is detected at block 520 may also include a response that the first automated assistant determines to be a suboptimal, inaccurate, or incomplete result provided by the second automated assistant in response to the user's request. In some implementations, the second automated assistant may be running on the client device alongside the first automated assistant. In other implementations, the second automated assistant may be running on another client device that is near the client device on which the first automated assistant is running (e.g., in the same room).

If, at an iteration of block 520, the first automated assistant determines that the second automated assistant did not fail to fulfill the request of the user, then the system proceeds to block 530, and the flow ends. On the other hand, if, at an iteration of block 520, the first automated assistant determines that the second automated assistant failed to fulfill the request of the user, then the system proceeds to block 540.

Still referring to block 520, in some implementations, in the determining whether or not the second automated assistant failed to fulfill the request of the user, the first automated assistant receives audio data that captures an initial response and then uses speaker identification on the audio data that captures the initial response to determine whether or not the initial response is provided by the second automated assistant. If the first automated assistant determines that the initial response was not provided by the second automated assistant, then the system proceeds to block 530, and the flow ends. On the other hand, if the first automated assistant determines that the initial response was provided by the second automated assistant, then the first automated assistant determines whether or not the initial response indicates a failure of the second automated assistant to fulfill the request of the user.

In some implementations, the first automated assistant processes the audio data that captures the initial response using a hotword detection model to determine whether or not the initial response fulfills the request of the user (e.g., by detecting failure hotwords such as "Sorry", "I can't do that", etc.). In other implementations, the first automated assistant processes the audio data that captures the initial response using automatic speech recognition to generate text and then processes the text using natural language processing techniques to determine whether or not the initial response fulfills the request of the user.

At block 540, in response to determining that the second automated assistant failed to fulfill the request of the user, the first automated assistant provides, to the user, an indication that the first automated assistant is available to fulfill the request of the user. In some implementations, the indication is a visual indication (e.g., an indication on a display or a light) and/or an audio indication (e.g., a chime) provided by the computing device on which the first automated assistant is executing.

At block 550, the first automated assistant determines whether or not an instruction to fulfill the request is received from the user. If, at an iteration of block 550, the first automated assistant determines that the instruction to fulfill the request has not been received from the user, then the system proceeds to block 530, and the flow ends. On the other hand, if, at an iteration of block 550, the first automated assistant determines that the instruction to fulfill the request has been received from the user, then the system proceeds to block 560.

At block 560, in response to receiving from the user the instruction to fulfill the request, the first automated assistant processes cached audio data that captures a spoken utterance of the user including the request that the second automated assistant failed to fulfill and/or processes features derived from the audio data (e.g., the ASR transcription) to determine a response that fulfills the request of the user. In some implementations, the cached audio data that is processed further captures an initial response provided by the second automated assistant to the user.

In some implementations, the second automated assistant is executed on the same computing device as the first automated assistant, and the cached audio data and/or features derived from the audio data (e.g., the ASR transcription) are received by the first automated assistant via a meta assistant that is executed on the computing device. In other implementations, the second automated assistant is executed on another computing device, and the cached audio data is received by the first automated assistant via one or more microphones of the computing device. In other implementations, the second automated assistant is executed on another computing device, and the first automated assistant receives the cached audio data and/or features derived from the audio data (e.g., the ASR transcription) via an application programming interface (API).

At block 570, the first automated assistant provides, to the user, the response that fulfills the request of the user (determined at block 560). In some implementations, the first automated assistant causes the response that fulfills the request of the user to be provided on the computing device on which the first automated assistant is executing (e.g., via the speakers or by displaying the response on a display of the computing device). In other implementations, the first automated assistant causes the response that fulfills the request of the user to be provided on another computing device (e.g., via speakers or a display).

Figure 6:
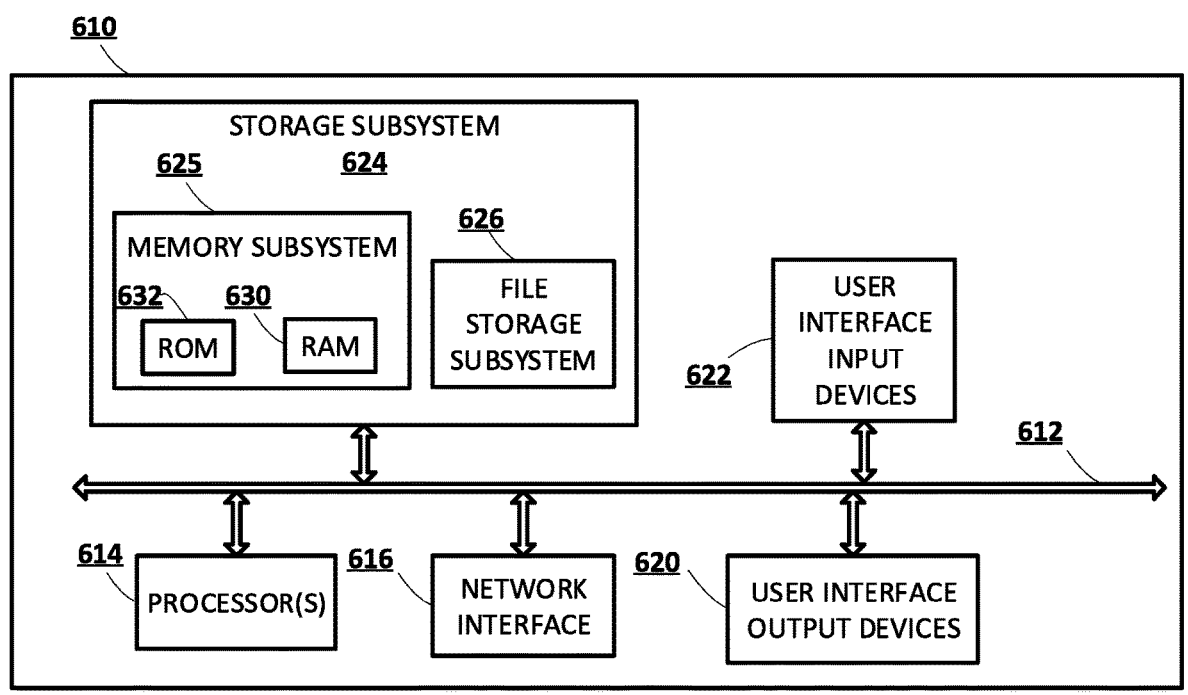
FIG. 6 depicts an example architecture of a computing device.

FIG. 6 is a block diagram of an example computing device 610 that may optionally be utilized to perform one or more aspects of techniques described herein. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1A and 1B.

These software modules are generally executed by processor 614 alone or in combination with other processors. The memory subsystem 625 included in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   determining, by a first automated assistant executed at least in part on a computing device operated by a user, that a second automated assistant provided an inaccurate result in response to a request of the user that was directed to the second automated assistant, wherein determining that the second automated assistant provided the inaccurate result in response to the request of the user that was directed to the second automated assistant comprises:
  processing, by the first automated assistant, audio data that captures an initial response provided by the second automated assistant responsive to the request; and
  determining, by the first automated assistant, and based on the processing of the audio data, that the initial response is the inaccurate result; and
in response to the first automated assistant determining that the second automated assistant provided the inaccurate result in response to the request of the user that was directed to the second automated assistant;
  automatically determining, by the first automated assistant, a response that fulfills the request of the user, wherein automatically determining the response that fulfills the request of the user comprises automatically processing, by the first automated assistant, cached audio data, or features of the cached audio data, that captures a spoken utterance of the user comprising the request responsive to which the second automated assistant provided the inaccurate result; and
  automatically providing, by the first automated assistant to the user, the response that fulfills the request of the user.

2. The method according to claim 1, wherein the cached audio data further captures the initial response provided by the second automated assistant to the request.

3. The method according to claim 1, wherein:
the second automated assistant is executed on the computing device, and
the cached audio data is received by the first automated assistant via a meta assistant that is executed on the computing device.

4. The method according to claim 1, wherein:
the second automated assistant is executed on another computing device, and
the cached audio data is received by the first automated assistant via one or more microphones of the computing device.

5. The method according to claim 1, wherein processing the audio data that captures the initial response provided by the second automated assistant responsive to the request comprises:
receiving the audio data that captures the initial response provided by the second automated assistant responsive to the request; and
using speaker identification on the audio data that captures the initial response to determine that the initial response is provided by the second automated assistant.

6. The method according to claim 5, wherein processing the audio data that captures the initial response provided by the second automated assistant responsive to the request further comprises:
processing the audio data that captures the initial response using a hotword detection model to determine that the initial response is the inaccurate result.

7. The method according to claim 5, wherein processing the audio data that captures the initial response provided by the second automated assistant responsive to the request further comprises:
processing the audio data that captures the initial response using automatic speech recognition to generate text; and
processing the text using natural language processing techniques to determine that the initial response is the inaccurate result.

8. The method according to claim 1, wherein the first automated assistant causes the response that fulfills the request of the user to be provided on another computing device.

9. The method according to claim 1, wherein the first automated assistant causes the response that fulfills the request of the user to be displayed on a display of the computing device.

10. A computer program product comprising one or more non-transitory computer-readable storage media having program instructions collectively stored on the one or more computer-readable storage media, the program instructions executable to:
  determine, by a first automated assistant executed at least in part on a computing device operated by a user, that a second automated assistant provided an inaccurate result in response to a request of the user that was directed to the second automated assistant, wherein the program instructions that are executable to determine that the second automated assistant provided the inaccurate result in response to the request of the user that was directed to the second automated assistant are executable to:
    process, by the first automated assistant, audio data that captures an initial response provided by the second automated assistant responsive to the request; and
    determine, by the first automated assistant, and based on the processing of the audio data, that the initial response is the inaccurate result; and
  in response to the first automated assistant determining that the second automated assistant provided the inaccurate result in response to the request of the user that was directed to the second automated assistant:
    automatically determine, by the first automated assistant, a response that fulfills the request of the user, wherein the program instructions that are executable to automatically determine the response that fulfills the request of the user are executable to automatically process, by the first automated assistant, cached audio data, or features of the cached audio data, that captures a spoken utterance of the user comprising the request responsive to which the second automated assistant provided the inaccurate result; and
    automatically provide, by the first automated assistant to the user, an indication of availability of the response that fulfills the request of the user.

11. The computer program product according to claim 10, wherein the cached audio data further captures the initial response provided by the second automated assistant to the request.

12. The computer program product according to claim 10, wherein:
the second automated assistant is executed on the computing device, and
the cached audio data is received by the first automated assistant via a meta assistant that is executed on the computing device.

13. The computer program product according to claim 10, wherein:
the second automated assistant is executed on another computing device, and
the cached audio data is received by the first automated assistant via one or more microphones of the computing device.

14. The computer program product according to claim 10, wherein the program instructions that are executable to process the audio data that captures the initial response provided by the second automated assistant responsive to the request are executable to:
- receive the audio data that captures the initial response provided by the second automated assistant responsive to the request;
- use speaker identification on the audio data that captures the initial response to determine that the initial response is provided by the second automated assistant; and
- process the audio data that captures the initial response using a hotword detection model to determine that the initial response is the inaccurate result.

15. The computer program product according to claim 10, wherein the indication of availability is a visual indication provided by the computing device.

16. The computer program product according to claim 15, the program instructions further being executable to:
- receive, by the first automated assistant, a request for the response that fulfills the request of the user; and
- in response to receiving the request for the response that fulfills the request of the user, provide, by the first automated assistant to the user, the response that fulfills the request of the user.

17. A system comprising:
- a processor, a computer-readable memory, one or more computer-readable storage media, and program instructions collectively stored on the one or more computer-readable storage media, the program instructions executable to:
- determine, by a first automated assistant executed at least in part on a computing device operated by a user, that a second automated assistant provided an inaccurate result in response to a request of the user that was directed to the second automated assistant, wherein the programs instructions that are executable to determine that the second automated assistant provided the inaccurate result in response to the request of the user that was directed to the second automated assistant are executable to:
  - process, by the first automated assistant, audio data that captures an initial response provided by the second automated assistant responsive to the request; and
  - determine, by the first automated assistant, and based on the processing of the audio data, that the initial response is the inaccurate result;
- in response to the first automated assistant determining that the second automated assistant provided the inaccurate result in response to the request of the user that was directed to the second automated assistant, automatically provide an indication to the user that the first automated assistant is available to fulfill the request of the user; and
- in response to receiving from the user an instruction to fulfill the request:
  - automatically determine, by the first automated assistant, a response that fulfills the request of the user, wherein the program instructions that are executable to automatically determine the response that fulfills the request of the user are executable to automatically process, by the first automated assistant, cached audio data, or features of the cached audio data, that captures a spoken utterance of the user comprising the request responsive to which the second automated assistant provided the inaccurate result; and
  - automatically provide, by the first automated assistant to the user, the response that fulfills the request of the user.

\* \* \* \* \*